United States Patent [19]

Johannesen

[11] 4,117,910

[45] Oct. 3, 1978

[54] DISC BRAKE AND MOUNTING THEREFOR

[75] Inventor: Donald D. Johannesen, South Bend, Ind.

[73] Assignee: The Bendix Corporation, Southfield, Mich.

[21] Appl. No.: 828,012

[22] Filed: Aug. 26, 1977

Related U.S. Application Data

[62] Division of Ser. No. 720,015, Sep. 2, 1976, abandoned.

[51] Int. Cl.² .................................................. F16D 65/56
[52] U.S. Cl. ...................................... 188/71.9; 188/73.4; 188/196 BA
[58] Field of Search ..................... 188/73.6, 71.7, 73.3, 188/73.4, 71.9, 72.9, 72.6, 196 M, 196 BA, 106 F

[56] References Cited

U.S. PATENT DOCUMENTS

| | | | |
|---|---|---|---|
| 3,291,262 | 12/1966 | Rosanowski et al. | 188/73.3 |
| 3,490,562 | 1/1970 | Press | 188/196 BA X |
| 3,664,469 | 5/1972 | Maurice | 188/71.1 X |
| 3,670,853 | 6/1972 | Brooks et al. | 188/72.6 |
| 3,708,041 | 1/1973 | Hahn | 188/72.9 |
| 3,819,015 | 6/1974 | Silberschlag | 188/71.9 X |
| 3,907,074 | 9/1975 | Rist | 188/72.9 |

*Primary Examiner*—George E. A. Halvosa
*Attorney, Agent, or Firm*—Paul David Schoenle; Ken C. Decker

[57] ABSTRACT

A disc brake includes a frame which carries a pair of friction elements on opposite sides of a rotor. A support fixedly secured to an axle housing cooperates with the frame to permit sliding axial movement and pivoting of the frame relative to the support. A pair of recesses on the support receive flange portions of the frame and form clearances at the connection between the frame and support. Edges on the frame define guides for slidingly carrying the pair of friction elements and recesses on the friction elements fit over the guide for mounting the elements thereon. Moreover, a clearance at the connection between the elements and frame permits the elements to easily slide relative to the frame and pivot relative thereto. A spring member disposed between the support and frame biases the frame to pivot relative to the support to engage the friction elements with the rotor. An adjuster between the frame and one of the friction elements rotate relative to the frame to limit retraction of the friction elements away from the rotor. The spring member includes a portion releasably engaging the adjuster to fix the position of the friction elements relative to the rotor.

1 Claim, 5 Drawing Figures

DISC BRAKE AND MOUNTING THEREFOR

This is a division of application Ser. No. 720,015 filed Sept. 2, 1976, presently abandoned.

BACKGROUND OF THE INVENTION

A tilting head disc brake is illustrated in U.S. Pat. No. 3,460,651, owned by the same assignee.

The aforementioned disc brake generally rotated a caliper housing about a mounting bracket to bring the friction elements into engagement with a rotor, thereby actuating braking. Because the caliper housing moved axially relative to the rotor in order to juxtaposition the friction elements to the rotor, the connection between the caliper housing and the mounting bracket was provided with pins, sleeves and springs to impart pivoting as well as sliding of the caliper housing relative to the mounting bracket.

Such connections between the caliper housing and mounting bracket were complicated and unsuited for easy assembly.

SUMMARY OF THE INVENTION

The present invention relates to a simple tilting head disc brake, performing the features of prior art tilting head disc brakes, yet comprising as few parts as possible for easy assembly.

In particular, a tilting, or pivoting, disc brake includes a support means fixedly secured to an axle housing. Recesses on the support means receive flanges on a frame, which frame carries a pair of friction elements. With the frame and support means interconnected, the frame is free to slide relative to the support means and forms a clearance with the support means at the recesses in order to permit rotation of the frame about the interconnection.

The frame overlaps a portion of the outer periphery of a rotor and includes an opening exposing the rotor. Edges defined by this opening form a guide surface cooperating with recesses on the friction elements to slidingly mount the same on the frame. Another clearance between the friction elements and the frame guide surface permits rotation of the friction elements relative to the frame.

A spring member is attached to the support means and biases the frame into a position engaging the friction elements with the rotor when the frame is in a brake-released position and biases the frame toward the brake-released position when the friction elements engage the rotor.

Adjustment means between a friction element and the frame extend to juxtaposition the elements near the rotor. A star wheel on the adjustment means releasably engages the spring member to fix the extension of the adjustment means.

DETAILED DESCRIPTION

Figure 1:
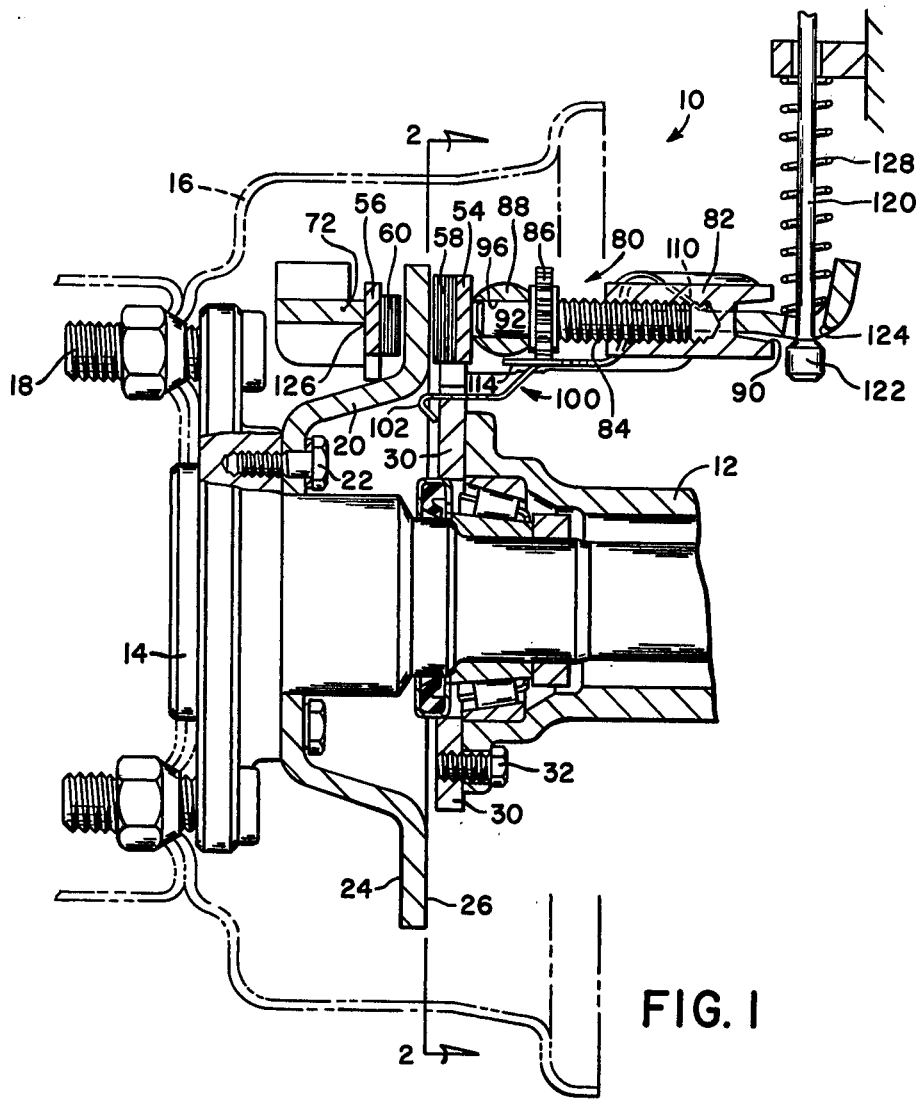
FIG. 1 is a sectional view of a disc brake showing the present invention.

Referring to the drawings, a tilting head disc brake assembly is generally indicated by the numeral 10. An axle housing 12 circumscribes an axle 14, which axle carries a wheel rim 16 by means of lugs 18. Bearings intermediate the housing 12 and axle 14 permit rotation of the axle for movement of a motor vehicle or trailer, as is well known in the prior art.

Extending radially outwardly from the axle 14, a rotor 20 is secured to the axle by means of bolts 22 and is provided with friction surfaces 24 and 26 at its radially outer periphery. A support 30 extends radially outwardly from the axle housing 12 and is fixedly secured thereto by bolts 32.

Figure 2:
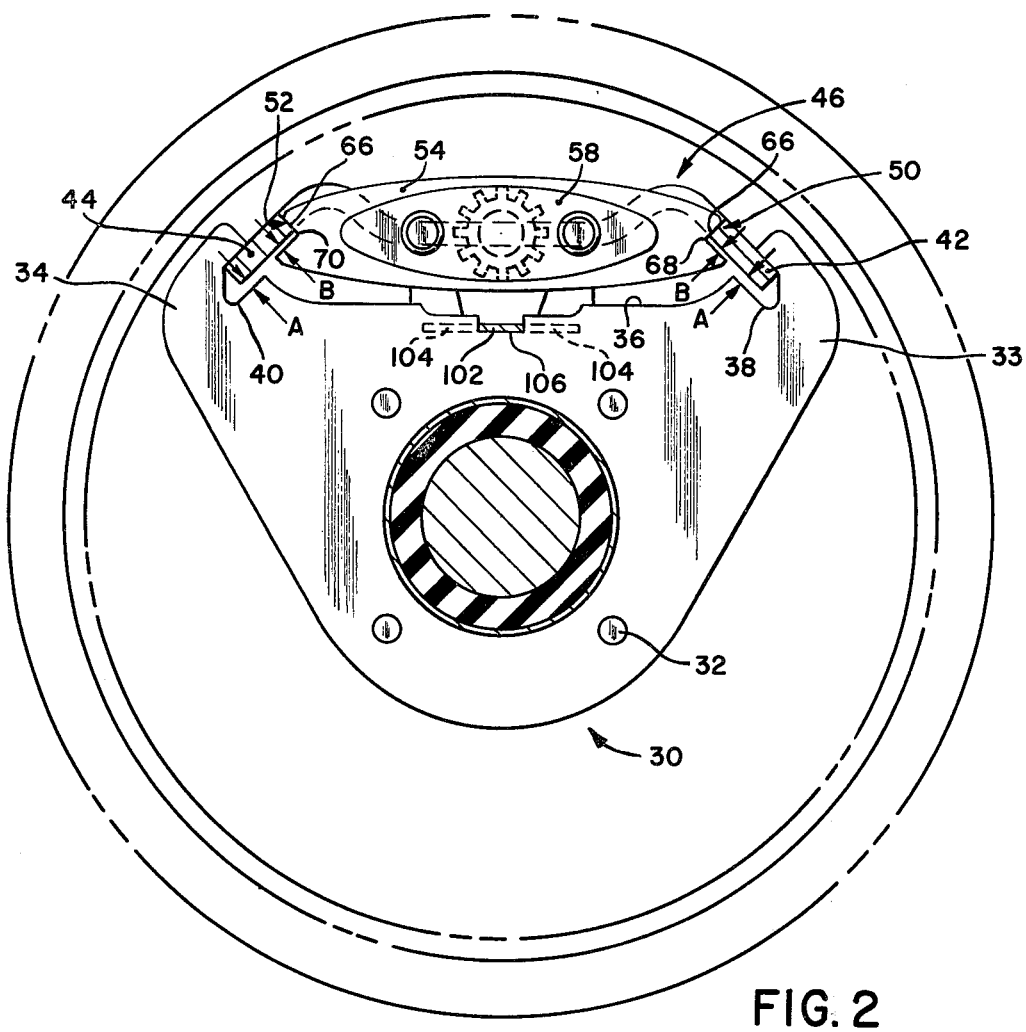
FIG. 2 is a view taken along line 2—2 of FIG. 1.

Turning to FIG. 2, the support 30 includes radially extending arms 32 and 34, forming a cavity 36 therebetween. On the inside of each arm on the cavity 36 are slots or recesses, 38 and 40, which slidingly receive flanges 42 and 44 of a frame 46. When the frame is disposed with its flanges in the recesses 38 and 40, a clearance A is defined at the recesses between the support 3 and frame 46. This clearance enables the frame 46 to pivot relative to the support in the absence of a pin connection therebetween.

Figure 3:
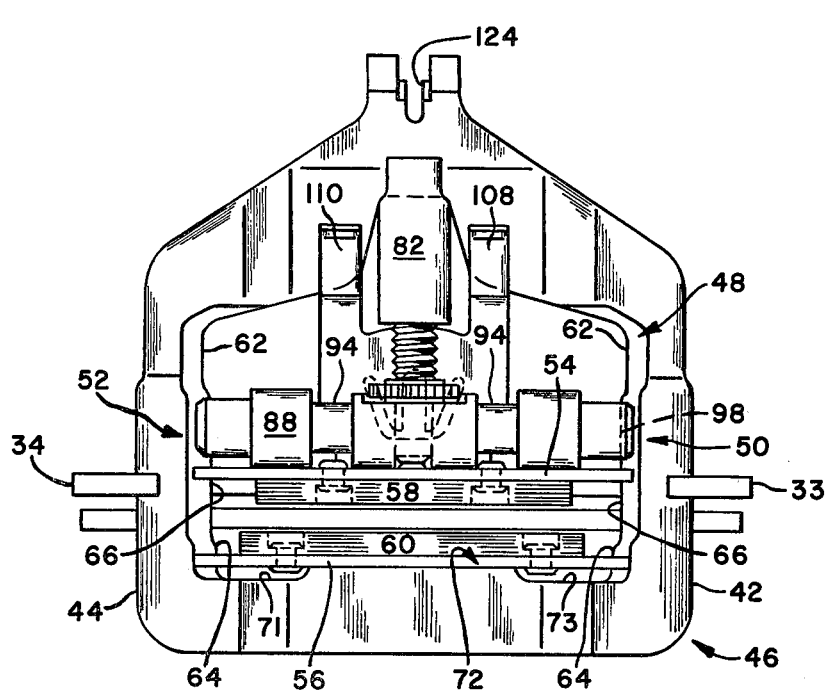
FIG. 3 is a top plan view of the tilting head disc brake of the present invention.

As shown in FIG. 3, the frame 46 is provided with an opening 48 exposing the rotor and forming axial edges defining guides 50 and 52. Friction elements 58 and 60 include respective backing plates 54 and 56 which have recesses receiving the guides for slidingly mounting the friction elements on the frame. The guides 50 and 52 cooperate to form an enlarged guide at 62 and a small guide at 64 on each side of an intermediate guide 66. Turning to FIG. 2, recesses 68 and 70 on backing plate 54 cooperate with intermediate guide 66 to provide for sliding fit backing between plate 54 and guide 66. Guide 62 forms an enlarged spacing between guides 50 and 52 such that backing plate 54 and friction element 58 are removable from guides 50 and 52. Likewise, backing plate 56 and friction element 60 cooperate with guides 64 and 66 to slidingly fit with the former guide and be removable via the latter guide from guides 50 and 52. Consequently, both backing plates and their respective friction elements are removable from the frame with the frame remaining interconnected to the support means.

When in sliding fit with respective guides 64 and 66, backing plates 56 and 54 form a clearance B, viewing FIG. 2, between the backing plate and frame to define a sliding radial interlocking fit. Such sliding radial interlocking fit at the clearance B enables the backing plates and friction elements to rotate relative to the frame as well as move axially relative to the frame.

The friction elements are positioned near the rotor friction faces 24 and 26 by means of a ridge 72 integrally formed with plate 46 and engaging backing plate 56 and an adjustment means 80. The adjustment means includes a nut 82, a stem 84, a star wheel 86 and a cylindrical push bar 88. The nut is engaged with the frame 46 by means of slot 90 opposite ridge 72 to prevent rotation of the nut. Threadably engaging the nut 82, the stem extends from the nut to the cylindrical push bar 88 and fixedly carries the star wheel therebetween. The cylindrical push bar 88 has a bore 96 for receiving an extended portion 92 of the stem. Viewing FIG. 3, annular grooves 94 on the push bar receive the rivet heads holding friction element 58 to backing plate 54 so that the cylindrical push bar 88 abuts the backing plate and element 58. Similarly, grooves 71 and 73 adjacent ridge 72 receive the rivet heads holding friction element 60 to backing place 56. Recesses 98 on the cylindrical push bar 88 cooperate with guides 66 and 62 in the same manner as backing plate recesses 68 and 70.

Figure 4:
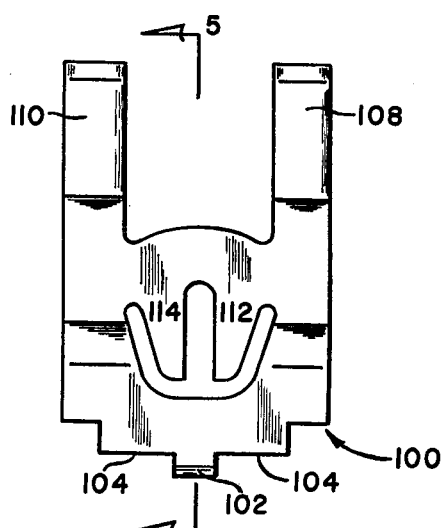
FIG. 4 is an enlarged plan view of the spring member utilized in FIG. 1.
Figure 5:
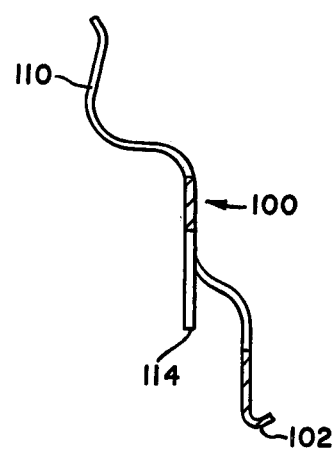
FIG. 5 is a cross-sectional view of FIG. 4 along line 5—5.

Turning next to FIGS. 4 and 5, a spring member 100 includes a projection 102 extending from shoulders 104 into notch 106 on cavity 36, shown in FIG. 2, to grip one side of support 30, while the shoulders 104 abut the other side of support 30, thereby fixing the spring member to the support. A pair of legs 108 and 110 opposite the projection extend radially outwardly and axially inwardly through opening 48 to slidingly engage the top of the frame opposite ridge 72. Disposed axially and radially intermediate the legs and the projection, a pair of fingers 112 and 114 protrude from the spring member to engage the star wheel 86. The fingers extend axially toward the support 30 and engage the star wheel throughout its axial disposition relative to the rotor.

A cable 120 with a nut 122 fixed at one end extends through frame slot 124 and is connected at its other end to an operator actuator, such as a parking brake pedal (not shown). Spring 128 surrounds the cable 120 and biases the frame to a brake-released position. Spring 128 and spring member 100 oppose each other when the frame 46 is in the brake-released position and cooperate with each other to bias the frame to a brake-released position when the frame is in a brake-application position.

MODE OF OPERATION

Adjusting the position of the friction elements 58 and 60 is accomplished by disengaging the fingers 112 and 114 of spring member 100 from the star wheel 86. Next, the star wheel is rotated to impart axial travel because of the threaded connection between the threaded stem and the nut. This travel urges the cylindrical push bar to the left, viewing FIG. 1. When the friction element 58 engages the friction face 26, further rotation of the star wheel moves the frame and friction element 60 to the right so that both elements 58 and 60 are juxtapositioned near the respective friction faces on the rotor 12. Thereafter, the fingers on the spring member are released to engage the star wheel to fix the position of the friction elements relative to the rotor.

In the brake-released position illustrated in FIG. 1, the spring member 100 resiliently engages the star wheel 86 via fingers 112 and 114 and the frame via legs 108 and 110 to dispose the frame flanges 42 and 44 in the uppermost position of recesses 38 and 40, as depicted in FIG. 2.

When the operator actuates the brake pedal (not shown) that is connected to cable 120, the cable moves upwardly viewing FIG. 1. The nut 122 on the cable transmits upward movement to the frame 46 to rotate the frame about the support recesses 38 and 40. Pivoting of the frame in a counterclockwise direction, viewing FIG. 1, lowers the ridge 72 and tilts the surface of ridge 72 that is engaging back plate 56 so that the lower corner edge 126 transmits axial inward movement to the friction element 60 to engage rotor friction surface 24. In a similar fashion the cylindrical push bar 88, viewing FIG. 1, is raised and axially moved to the left to impart axial travel to the friction element 58 to engage rotor friction surface 26. Moreover, as the spring 128 is maintained in compression, the upward movement of the cable 120 increases the compression of the spring 128 when the frame is pivoted counterclockwise, and the spring 100 assists in the counterclockwise rotation in view of the engagement between the spring 100 and the support 30. Further movement of the cable 120 causes the spring 100 to pass its rest position so that the cable 120 pivots the frame against the resilient force of spring 100 and spring 128.

When the parking brake is disengaged, the spring member 100 and spring 128 bias the frame to move to a brake-released position shown in FIG. 1. Rotating in a clockwise direction, the frame moves the ridge 72 and cylindrical push bar 88 away from the rotor 12 to permit the friction elements to slide on the guides 50 and 52 away from rotor 12.

Although the preferred embodiment illustrated utilizes a ridge and cylindrical push bar to impart movement to the friction elements, it is contemplated that a pair of cylindrical push bars similar to push bar 88 or a pair of ridges similar to ridge 72 arranged on opposite sides of the rotor would suffice to impart axial movement to the friction elements.

I claim:
1. A disc brake comprising a rotor, support means spaced from and adjacent to said rotor, a frame cooperating with said support means for sliding and pivoting relative to said support means, a pair of friction elements carried by said frame on opposite sides of said rotor, adjustment means disposed between one of said friction elements and said frame, said adjustment means comprising a nut engaging said frame to prevent rotation relative to the same, a push bar engaging said one friction element and a stem between the push bar and nut, said stem having a projection engaging the push bar, a threaded section opposite the projection engaging the nut and a star wheel intermediate the projection and threaded section, said star wheel providing rotation of the stem to engage the threaded section with the nut thereby moving the push bar into engagement with said one friction element to move the same closer to said rotor, and a spring member engaging and frame and support means to bias said frame to allow disengagement of said friction elements and rotor and cooperating with said star wheel to fix the rotation of the star wheel relative thereto.

* * * * *